# 2,711,425

RECOVERING ORGANIC ACIDS FROM FERMENTATION WASTES BY IRON SALT PRECIPITATION

Charles A. Fort and Burns Ashby Smith, New Orleans, La., assignors to the United States of America as represented by the Secretary of Agriculture No Drawing. Application March 18, 1952, Serial No. 277,311

1 Claim. (Cl. 260—527)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to producing aconitic acid by separating it from the waste derived from the fermentation of a cane sugar bearing material, an example of such a waste being the distillery slops derived from the fermentation for the production of byproducts, such as alcohol, yeast, etc., of the residue remaining after producing sugar from sugar bearing materials used in the sugar cane processing industry.

Such sugar bearing materials very rather widely in their organic acid content, but in general, they contain appreciable amounts of aconitic acid. Aconitic acid is a unique tricarboxylic monoolefinic acid which is becoming increasingly valuable to industries in fields such as the production of plastics, detergents, others, and the like. The aconitic acid concentration in the sugar bearing materials averages about 1% based on the juice solids, and in blackstrap molasses, the concentration averages about 4% based upon the molasses solids.

Various procedures have been developed for recovering aconitic acid from the sugar bearing materials, e. g., the processes described in U. S. Patents 2,280,085, 2,359,537 and 2,469,090 involving the precipitation of the acid as a mixed calcium-magnesium salt. However, such processes yield little, if any, aconitic acid when they are applied to the residues of such sugar-bearing materials after they have been subjected to fermentation.

The fermentation wastes, or distillery slops, comprise rather dilute solutions of the organic acid salt and other nonsugar constituents. The disposal of large quantities of distillery slops resulting from the manufacture of alcohol from cane molasses is a problem.

In general according to the invention, the waste derived from the fermentation of a cane sugar bearing material is adjusted to a pH about from 3.5 to 4.5 and a water soluble iron salt is mixed therewith. Iron salts of the organic acids present, particularly aconitic acid, are thus formed in the acidified residue, which precipitate and the precipitate is isolated. The precipitate is then dissolved in an inorganic acid to liberate the aconitic acid from its iron salt and the aconitic acid is isolated.

When the organic acids are isolated in the above manner, aconitic acid can be recovered in yields of from 5 to 15% based on the amount of dry solids left in the waste after fermentation.

The precipitation of organic acids in the form of their iron salts in accordance with the process of this invention is preferably conducted by a relatively slow mixing of an aqueous solution of an iron salt to a gently but thoroughly agitated acidified waste. However, solid iron salts or solutions of iron salts in water miscible solvents can suitably be added with or without stirring. The precipitation can suitably be conducted at any temperature from about 0 to 100° C., but, is preferably conducted at about normal room temperature. In general, it is preferred to add at least an equivalent of iron ions based on the amount of acid anions, but where a partial precipitation of the organic acids is economically feasible, a lesser amount can suitably be added. The pH of the waste during the precipitation, can suitably range from about 2.0 to 7.0 but the adjustment of the pH to from about 3.5 to 4.5 by the addition of a water soluble base or acid is preferred, particularly when an acid reacting iron salt is used as the precipitating agent. The adjustment can suitably be made before, during, or after the addition of the iron salt, but is preferably made before the iron salt is added.

Illustrative examples of suitable iron salts include ferric sulphate, ferric chloride, ferric nitrate, ferric ammonium sulphate, ferrous acetate, ferrous chloride, ferrous nitrate, ferrous ammonium sulphate, and the like. Ferric chloride and ferric sulphate are particularly preferred.

The iron salts are preferably added in the form of aqueous solutions containing from about 15 to 35% of the iron salt. The addition of an approximately 20% ferric sulphate solution in an amount equal to about 10% of the volume of the aconitic acid containing waste is particularly preferred.

The precipitated iron salt can suitably be isolated by any of the conventional methods of isolating precipitated solids from liquids. Slow precipitation, and mild digestion of the precipitate, of course, aid in the separation of the precipitated salts.

Where the pH of the waste used is below 3.5, and where the iron salt to be used as a precipitating agent contains an anion that forms a well defined crystalline precipitate with a cation that forms a water soluble hydroxide, it is preferred to adjust the pH of the waste by the addition of the hydroxide of such a cation. For example, where the waste has a pH below 3.5 and ferric sulfate is to be used as the precipitating agent, it is preferred to adjust the pH to the range of from about 3.5 to 4.5 by the addition of calcium hydroxide. This preferred procedure of adjusting the pH generally causes enough well defined crystals to be formed to markedly improve the filtration properties of the precipitated iron salts.

The isolated iron salts are preferably acidified by contacting them with an aqueous medium having a pH low enough that the salts will dissolve in it at a feasible rate. The volume of such an aqueous medium is preferably maintained as low as it is feasible, and the acid used to lower the pH of said medium is preferably a concentrated acid, and is preferably the acid corresponding to the iron salt which was used as a precipitating agent. While the pH of said medium can be lowered to any pH at which the salts dissolve at a feasible rate, a pH of about 1.0 has been found to be particularly satisfactory.

The solution of organic acid produced by the acidification of the precipitated iron salts is preferably concentrated by a distillation at the lowest feasible temperature under normal or sub-atmospheric pressures. The extent of the concentration preferred in each particular case depends upon the manner in which the organic materials are to be isolated. The volatile portions of the liquid residue contain valuable volatile organic acids, particularly formic, acetic, and propionic acids, and these acids are preferably separated from the distillate, by conventional separation procedure, to provide valuable byproducts of the process of the present invention.

The principal nonvolatile acids which can feasibly be recovered by the process of the present invention include aconitic, succinic, fumaric, glycollic, and lactic acids although other unidentified organic acids are also present, and probably will prove to be valuable additional byproducts when the fractions in which they are concentrated are accumulated in quantity.

The aqueous solutions of organic acids can suitably be concentrated to provide an aqueous organic acid of sufficiently rapid reactivity, and, in the presence of catalytic amounts of acids such as sulfuric, sulfonic, and the like acids, esterified. The esters can then be readily separated by conventional fractional distillation procedures. Alternatively, the aqueous solutions of acids can be concentrated to an economically handled volume and contacted with selective solvents for the organic acids that they contain. Solvents such as methyl ethyl ketone, butyl alcohol, methyl isobutyl ketone, and secondary amyl alcohols have been found to be particularly suitable. The acids so dissolved in the respective organic solvents can be conveniently separated and recovered by conventional separation procedures.

The following examples are presented to exhibit the invention in more detail.

Example 1

The pH of 12 liters of settled decanted cane molasses distillery slops was adjusted to 4.0 pH by the addition of milk of lime. While the solution was gently but thoroughly agitated 1,200 milliliters of a 20% aqueous solution of ferric sulphate was added. The precipitate of ferric salts of the organic acids was separated by filtration, and the filtrate was discarded. The precipitate was reacted with concentrated sulfuric acid, with rapid stirring, until a solution having a pH of about 1.0 was produced. This produced about 2 liters of solution. The solution was concentrated by evaporation in vacuo to a volume of about 1 liter. The concentrated solution contained about 90% of the aconitic acid assay shown by the original charge of slops. The concentrated acid solution was extracted in a liquid-liquid extractor using methyl ethyl ketone. By the extraction 49 grams of aconitic acid plus other acids was obtained.

Example 2

A 12 liter charge of the same distillery slops used in Example 1 was treated in the same manner as that used in Example 1 producing 2 liters of a sulfuric acid solution of the organic acids contained in the charge. The sulfuric acid solution was then evaporated in vacuo to 500 milliliters. The concentrated solution was refluxed with 200 milliliters of normal butyl alcohol in 400 milliliters of benzene in an apparatus having a trap for separating the water from the refluxing vapors and returning the organic components to the reaction vessel. The refluxing was continued until water was no longer eliminated. The reaction mixture was washed with aqueous sodium carbonate and the organic layer was separated and subjected to a vacuum fractional distillation. A 23 gram fraction was recovered which consisted essentially of butyl succinate and a 63 gram fraction was recovered which consisted of tributyl aconitate. The residue, 16 grams, of higher boiling esters, was not further examined.

Having thus described our invention, we claim:

A process for the production of aconitic acid comprising adjusting the pH of the waste derived from the fermentation of a cane sugar bearing material to about from 3.5 to 4.5, mixing a water soluble iron salt with the waste, isolating the precipitate of iron salt of aconitic acid formed in the acidified waste, dissolving the precipitate in an aqueous inorganic acid, and isolating the aconitic acid so produced.

References Cited in the file of this patent

UNITED STATES PATENTS

| | | |
|---|---|---|
| 1,344,850 | Bassett | June 29, 1920 |
| 1,357,138 | Bassett | Oct. 26, 1920 |